United States Patent Office
3,306,872
Patented Feb. 28, 1967

3,306,872
METHOD FOR PRODUCING A POLYETHER RESIN
Russel L. Maycock, Houston, and Alton J. Landua, Seabrook, Tex., assignors to Shell Oil Company, New York, N.Y., a corporation of Delaware
No Drawing. Filed Oct. 16, 1961, Ser. No. 145,486
10 Claims. (Cl. 260—32.8)

This application is a continuation-in-part of our copending application Serial No. 46,387, filed August 1, 1960, now abandoned.

This invention relates to linear polyether resins. It relates particularly to linear polyether resins characterized by high impact resistance and to processes for their production.

High resistance to impact is a property which is particularly desirable in plastics used in applications in which they are exposed to mechanical shock. Typical uses are housings for radios and other electronic equipment and gears for small machines and applicances. In many instances plastics which are otherwise satisfactory for a particular application are found to be deficient in impact resistance.

The so-called polycarbonate resins have recently achieved commercial importance, in part because they possess high impact resistance. However, the presence of the carbonate bond makes them susceptible to chemical attack by alkalis and in general weakens their chemical resistance. Another disadvantage of polycarbonates is that they are difficult to handle in injection molding equipment because they are resistant to flow even at very high temperature and pressures.

This invention provides a resin which is characterized by high impact resistance when in the form of molded, extruded or otherwise formed shapes; this resin is similar to polycarbonates in a number of properties and superior in some respects. The resins of this invention have excellent resistance to numerous chemicals, flow readily at injection molding conditions, and are suitable for the above-mentioned uses.

The resins of this invention, without any chemical modification, are also suitable for the preparation of surface coatings which have excellent coating and adhesion properties. Coatings prepared from solutions of these resins have outstanding toughness, adhesion, abrasion resistance, hardness, flexibility and chemical resistance. They can be used on a great variety of base materials. Further, because of their excellent adhesion to various materials these resins are suitable for use as adhesives for bonding various materials.

The resins of this invention are, essentially, linear condensation products of dihydric phenols and diepoxides, having certain characteristic properties including high impact resistance as molded, extruded or otherwise formed shapes. They are obtained by reacting a diepoxide and a dihydric phenol in solutions of low water content under controlled conditions and ultimately recovering the product from solution with complete removal of all solvent.

Particularly useful compounds are produced according to this invention by the reaction of 2,2-bis(4-hydroxyphenyl)propane and the diglycidyl ether thereof, namely 2,2-bis(2,3-epoxypropoxyphenyl)propane. The phenolic compound is often referred to in industry as "p,p'-bisphenol A"; a technical grade of the named compound is generally referred to simply as "bisphenol A." These terms are at times used herein for convenience of reference. Similarly, the diglycidyl compound may be conveniently designated "diglycidyl ether of p,p'-bisphenol A."

The description of this invention will be made in substantial part by reference to polyethers produced by reacting p,p'-bisphenol A with diglycidyl ether and diglycidyl polyethers prepared from p,p'-bisphenol A and epichlorohydrin. Satisfactory results can also be obtained, however, when using other phenolic compounds and diepoxides, and particularly when using certain other bisphenols and their diglycidyl ethers and polyethers.

It is an object of this invention to provide linear polyether resins characterized by linearity at high molecular weight and by high impact resistance when in the form of molded or otherwise formed shapes. Another object is to provide methods for the production of linear polyether resins of high impact resistance. It is a further specific object to provide condensation products of p,p'-bisphenol A and diglycidyl polyethers which are the reaction products of said bisphenol and epichlorohydrin, said latter products having number average molecular weights up to about 2000. It is a specific object to provide a condensation product of p,p'-bisphenol A and the diglycidyl ether of p,p'-bisphenol A which is characterized by high impact resistance, and a method for its preparation. These and other objects of the invention will be better understood from the following detailed description thereof.

The resins of this invention differ fundamentally from the well-known epoxy resins. Epoxy resins are normally made and applied by reacting polyglycidyl ethers of dihydric phenols or formulations containing them with curing agents, the reaction resulting in the formation of highly cross-linked, thermoset products. By contrast, the resins of this invention are linear, characterized by the substantial absence of cross-linking or branching and requiring no curing agents for many ends uses.

It has been proposed to prepare thermoset resins from a dihydric phenol and a diglycidyl ether of a dihydric phenol. The reaction is promoted by mild heating or use of catalysts and results in the formation of a gel and subsequently of a hard, infusible, cross-linked resin. The preparation of such resins is described in U.S. 2,506,486 to Bender et al. The reactants of Bender et al. are, at least in many instances, also suitable as reactants for producing the resins of this invention. The reaction products of Bender et al. and of this invention are however completely different as a result of the use of entirely different reaction conditions.

The production of fiber-forming thermoplastic resins by the condensation of epichlorohydrin and phenolic dihydroxy compounds is described in U.S. 2,602,075 to Carpenter et al. The process can be operated in one or two steps. The procedure of the patent includes heating the reactants, either as such or in the presence of a diluent, generally alcohol, and a large amount of water, in such a manner that the resin precipitates during the heating step. The resin produced in this manner is suitable for drawing fibers. Due to the condititon under which they are produced, the resins of Carpenter et al. are branched to a substantial extent. Thus, although there is some resemblance between some modes of the process of Carpenter et al. and the present invention, it has been found that the resins of Carpenter et al. do not have the high impact resistance possessed by the resins of the present invention.

As has already been stated, resins of particularly outstanding impact resistance are produced according to this invention by employing p,p'-bisphenol A as the dihydric phenol. This compound is suitably prepared by the condensation of phenol and acetone, using known reaction methods. Another related compound which has been found to produce outstanding results is the dihydric phenol which results from the reaction of phenol and acetophenone, namely bis(4-hydroxyphenyl)methylphenylmethane. Other preferred dihydric phenols are bisphenols having two phenyl groups on the same carbon atom, prepared by the condensation of phenol or a substituted phenol with other ketones or aldehydes. Preferred phenols may be represented by the general formula

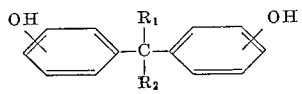

in which $R_1$ and $R_2$ when taken collectively with the connector carbon C are from the group consisting of cyclohexyl and alkyl-substituted cyclohexyl, and when taken separately are from the group consisting of hydrogen, alkyl, cyclohexyl, phenyl, alkyl-substituted cyclohexyl, alkyl substituted phenyl, halogen substituted cyclohexyl and halogen substituted phenyl groups with the total number of carbon atoms in the group or groups attached to said connector carbon atom not exceeding eighteen and the number of carbon atoms in any of said alkyl substituent groups not exceeding six. The preferred phenols have the hydroxyl groups in the 4,4' positions, but compounds with hydroxyls in the 2,2', 3,3', 2,4', and other arrangements may also be used. $R_1$ and $R_2$ suitably are methyl, ethyl, isobutyl, n-nonyl, n-heptadecyl and the like. Other dihydric phenols may also be employed, excepting those which have two hydroxyl groups in ortho position on a single benzene ring. Suitable compounds are listed in more detail in the above mentioned Bender et al. and Carpenter et al. patents.

The dihydric phenol employed in the process of this invention may be substantially 100 percent pure, or may be a technical grade of somewhat lower purity. Concentrates of dihydric phenols containing, for example, 90 to 100 percent of the pure compound may be used.

The second reactant in the condensation process, the diepoxide, is a compound having two vicinal epoxide groups (oxirane rings) in terminal positions in the molecule, usually in the form of an oxygen atom bound to two terminal carbons of an alkyl group, though the epoxide may also be on a ring, such as a cyclohexyl ring. Suitable diepoxides are terminal diepoxyalkanes, e.g., 1,2-epoxy-3,4-epoxybutane, 1,2-epoxy-5,6-epoxyhexane, 1,2-epoxy-7,8-epoxyoctane and the like. Others are terminal diepoxides containing ether linkages, such as bis(2,3-epoxypropyl)ether and bis(2,3-epoxy-2-methylpropyl) ether; diglycidyl ethers of alpha,omega glycols such as the diglycidyl ethers of ethylene glycol, trimethylene glycol, and tetramethylene glycol; and diglycidyl ethers of dihydric phenols.

Diglycidyl ethers of the dihydric phenols referred to above are generally suitable for use in this invention. One may suitably use the diglycidyl ether of the same phenol which is employed as the other reactant. Thus, for example, bisphenol A is suitably condensed with diglycidyl ether of bisphenol A. Similarly, the bisphenol of acetophenone is suitably condensed with diglycidyl ether thereof. Useful resins can also be prepared by condensing a dihydric phenol with the diglycidyl ether of a different dihydric phenol. For example, useful condensation products have been prepared according to this invention from the diglycidyl ether of bisphenol A and the dihydric phenol prepared from phenol and acetophenone.

In preparing the products of this invention the epoxy reagent may be a pure diepoxide or a crude mixture containing a substantial proportion of diepoxide, e.g., 70% or more. It is important, however, that the crude reagent is free of monoepoxide and of monohydric alcohol or phenol. It has been found, for example, that nearly equivalent results with respect to the properties of the resulting resins can be in many cases obtained by employing a crude mixture containing at least 70 to 85% of diglycidyl ether of a dihydric phenol but no monoepoxide, monohydric alcohol or monohydric phenol, as can be obtained with the purified diglycidyl ether. This crude product typically is a viscous liquid having a number average molecular weight of about 350 and an epoxide value of 0.50 epoxide equivalent per 100 grams. A typical preparation is described in U.S. 2,633,458 to Shokal under "Polyether A." The crude mixture is prepared by reacting the dihydric phenol with a large molar excess, e.g., 5:1 or more, of epichlorohydrin per mol of dihydric phenol, in the presence of about one mol of a basic compound per mole of dihydric phenol. For best results the epichlorohydrin is used in a ratio of at least about 10:1 based on the dihydric phenol in the preparation of a suitable diglycidyl ether mixture.

Another particularly useful group of diepoxides for preparing the reaction products of this invention are the diglycidyl polyethers produced by reacting bisphenol A with epichlorohydrin in the presence of a basic compound at ratios of epichlorohydrin to bisphenol A substantially below 5:1, e.g., down to about 1.45:1. A particularly preferred product of this type is prepared at epichlorohydrin to bisphenol A ratios between 1.45:1 and 1.60:1. The Durrans' mercury method melting point of this product is about 70° C., its number average molecular weight about 900 and its epoxide value about 0.20 equivalents per 100 grams.

At higher epichlorohydrin to bisphenol A ratios, the properties of the resin are intermediate between those of the one just described and the crude diglycidyl ether product. In general, suitable reaction products of epichlorohydrin and bisphenol A for use as epoxides in this invention are those prepared as described in the said Shokal patent U.S. 2,633,458, having number average molecular weights from about 340 to about 2,000. This includes polyether A through E of said patent.

The condensation reaction between a dihydric phenol and a diglycidyl ether of a dihydric phenol requires the presence of a basic condensation catalyst. The catalyst may, for example, be added as a concentrated aqueous solution of sodium or potassium hydroxide or a sodium salt of a phenol. It is sometimes desirable to use as catalyst a sodium salt of the same dihydric phenol which is used as a reactant. These salts are generally solids which are dissolved in the reaction mixture. It has been found that very satisfactory results are also obtained when using concentrated aqueous sodium hydroxide or benzyltrimethyl ammonium hydroxide. When the catalyst is added as an aqueous solution, a concentrated solution is used since it is not desirable to have more than a small amount of water present in the reaction mixture.

The concentration of catalyst present during the condensation reaction must be held to a very low value; otherwise branched polymers of low impact value are produced. However, it is also found that reaction rates increase proportionately with catalyst concentration. The useful range of catalyst concentration is from 0.005 to 0.100 mole per mole of the contained bisphenol. For best results the concentration is preferably between 0.010 and 0.025 mole per mole. It may occur that some of the catalyst reacts with impurities in the reactants. This results in a reduction of the rate of reaction and can stop the reaction prematurely. Adding a further amount of catalyst then permits the reaction to continue. It has been found that basic catalyst reacts with saponifiable chlorine if the latter is present in the diglycidyl ether reactant. It is therefore useful to add initially an extra amount of catalyst, sufficient to react with such chlorine, to prevent slowing down of the reaction.

It is preferred to keep the water content of the reaction mixture as low as possible, preferably below 0.5% by weight, more preferably below 0.2% by weight, and still more preferably below 0.12% by weight. In any event, the water content is to be maintained so as not to exceed about 1 percent by weight. The objectionable effect of water is illustrated in Example 21.

Careful control of the ratio of dihydric phenol and diglycidyl ether in the reaction mixture is of greatest importance in order to obtain a product having the desired characteristics. When technical grades of one or several reagents are employed, the correct ratio is maintained by determining the epoxy equivalence and the phenolic hydroxide equivalency of the reagents and carrying out the reaction with a mixture which contains not less than 0.980 and not more than 1.025 vic epoxide groups

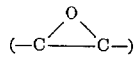

per phenolic hydroxide group. Best results are obtained with epoxy to phenolic hydroxide ratios in the range from 0.999:1.000 to 1.005:1.000, most preferably exactly 1,000:1,000 or as close thereto as can be practically obtained. A slight excess of epoxy groups is preferred to even a very small excess of phenolic hydroxyl groups. When the catalyst employed is a basic salt of a dihydric phenol, then the phenol present in the catalyst is considered part of the phenolic reagent for purposes of calculating the proper ratio of reactants. Similarly, when the technical grade of the diepoxide contains some saponifiable chlorine, the chlorohydrin groups are considered the equivalent of epoxy groups since they are converted thereto during the condensation reaction in the presence of a basic catalyst.

The reaction is carried out in solution in a solvent which meets the following criteria: (1) It is capable of maintaining reactants and reaction products in solution, at reaction temperatures, in the concentrations employed. These concentrations generally range between 20 and 60 percent by weight of the total reaction mixture. When the original concentration is high, it is generally necessary to add additional solvent during the course of the reaction to reduce the viscosity of the mixture and to maintain the product in solution. (2) It does not react significantly with epoxide groups or phenolic hydroxyl groups. Water and alcohols, for example, tend to interreact with the reactants and are therefore not suitable as solvents. (3) It is readily and completely removable from the final reaction mixture to permit recovery of a resin substantially completely free of solvent. Desired high impact resistance is a property which requires complete removal of solvent. In the production of resin for use in molding, extrusion, and the like, solvent is removed from the reaction mixture. In the production of resin for surface coatings, the resin may remain associated with solvent until it is actually applied as a coating and the solvent is removed by evaporation under suitable conditions. (4) Its boiling point must be such that the reaction can be carried out at 75° to 150° C. at a practical pressure. The solvent may be a mixture of individual compounds.

Useful solvents which meet these criteria are, for example, certain ketones, halogenated hydrocarbons and ethers. Methyl ethyl ketone is a preferred solvent. Cyclohexanone, mesityl oxide and other ketones may be used. Chloroform, 1,2-dichloroethane and other chlorinated hydrocarbons may be used, particularly in admixture with ketones. Ethers, such as dioxane, tetrahydrofuran, dimethoxyethane and lower alkyl (methyl or ethyl) ethers of ethylene glycol are suitable, alone or in admixture with ketones. Other solvents which meet the above criteria may be employed if desired.

A necessary process step for obtaining solid resin of high impact resistance suitable for molding or other forming is the complete removal of solvent from the resin mass.

A suitable method for recovering resin of high impact strength comprises adjusting the reaction mixture to a resin content of about 20 percent by weight in a solvent which is capable of dissolving rapidly when the mass is poured into a large volume of water; gradually pouring the solution as a thin stream into a strongly agitated large volume of cold water; recovering the resin as a mass of shreds; and drying the shreds. In this method the original solvent must be soluble in the water. Water as a receiving solvent may be replaced by another liquid (a single compound or mixture) in which the resin is insoluble but the original solvent is completely soluble.

A different method of solvent removal which has been found to result in the production of high impact resistant resins comprises pouring the resin solution onto the top roll of a two-roll mill. The solution passes between the rolls and solvent is quickly evaporated from the resulting thin film. The resin is sheeted off, free of solvent.

Other methods may be employed in which the resin solution is introduced as a thin body, e.g., having a thickness not exceeding about ¼ inch, into a fluid into which the solvent is capable of diffusing at a rapid rate while the resin is insoluble therein.

Complete removal of solvent from the reaction mass before forming into a final product is not essential when the resin is to be used in surface coatings, since the resin is generally applied to the surface to be coated in the form of a solution. Solvents used in the reaction mixture generally are also suitable in the preparation of surface coatings. In the production of resin for surface coatings, it is preferred to wash the reaction mixture to remove the salt formed in the catalyst neutralization step. Washing consists of contacting the resin solution with sufficient water to extract the salt from the resin solution phase into the water phase. The washed reaction mixture may be stabilized by removing all solvent by heating under vacuum, and the resulting resin then redissolved in a suitable solvent for the production of surface coatings. Stabilization and re-solution is not necessary, however, unless it is desired to recover the reaction solvent for reuse and dissolve resin in a different solvent.

It is, of course, also possible in employing the resins of this invention for surface coatings to recover the resin as a solid in the previously described manner and then redissolve the solid to produce the desired coating solution.

Suitable methods for carrying out the reaction of this invention will be described in detail hereafter in connection with illustrative examples of methods of carrying out the process.

An outstanding feature of this invention is the high impact resistance of its resins. Three methods of measuring the impact resistance of the resins have been employed. One convenient test consists of preparing discs of 5/32 inch thickness and 1¼ inch diameter and testing them in a "Gardner variable impact tester," in which a weight is dropped on a sample from a variable height. The Gardner tester is normally used in testing impact resistance of surface coatings. The maximum impact which is produced in this test is 160 in.-lb. The Gardner test is described in "Physical and Chemical Examination of Paints, Varnishes, Lacquers and Colors" by Gardner and Sward, 11th Edition, 1950, pp. 173 et seq. and 188A and in "Organic Coating Technology" by H. F. Payne, vol. 1, John Wiley and Sons, New York, 1954, pp. 647–648.

A conventional method of measuring impact resistance of resins is the Izod impact strength determined according to ASTM method D 256. The test can be carried out on a notched or an unnotched bar. In the former case the impact resistance is reported in ft.-lbs./in. of notch and in the latter case in ft.-lbs./in. of bar width or in ft.-lbs./cu. in.

Certain resins produced according to this process have the unusual characteristic of being capable of breaking either in a brittle or a ductile manner when tested in the Izod impact test using a notched bar. Specimens of a single preparation of the resin, when tested as notched bars, typically show a strength of 2 to 5 ft.-lb./in. notch for brittle break and 17 to 32 ft.-lb./in. notch for ductile break.

It was found in a study in which high speed movies were made of test samples during impact and break in the Izod machine that even in the brittle break a considerable amount of bending of the bar is apparent prior to breaking. During this period of bending, transient strain patterns were built up to a considerable degree, but most of these strains were relieved immediately upon breaking of the specimen, indicating that the initial bending was an elastic deformation. This is also shown by hitting the specimen a blow which is insufficient to break it and observing the deformation and recovery by use of high speed movies. It was also observed that the bar tends to "fly apart" as the break occurs, which is interpreted as being caused by the rapid release of the energy stored in the elastic deformation.

These observations are of interest since they show that even the bars of the resin which fracture by "brittle" break have considerable elasticity, which would be a very useful property for some possible uses of this resin. This behavior of the resin of this invention can be contrasted to that of general purpose polystyrene. When the latter is observed with the aid of high speed movies there is little or no elastic deformation observed, as indicated by no apparent bending of the specimen prior to breaking and only a slight indication of strain formation.

For further purpose of comparison, it is known that Nylon 66 shows a notched Izod impact strength of 0.9 to 2 ft.-lb./inch of notch, but is nevertheless recognized to be a tough material. Its reported tensile impact strength is approximately 350 ft.-lb./cu. inch.

It was also observed that samples of resin which were prepared according to this invention failed by ductile deformation without tearing or breaking when tested as unnotched Izod bars. The unnotched impact values measured on a 0.5 inch thick bar were in the range of 50 to 70 ft.-lbs./inch of bar width. This contrasts with results on unnotched Izod bars made from a commercial grade of high impact polystyrene which gave a brittle break and had an impact resistance of only about 10 ft.-lb./in. width of bar.

In the illustrative examples, results of various tests are reported. The following standard tests are included; the number in parentheses is the ASTM test designation: Tensile properties, including elongation (D 638); Rockwell hardness (D 785); heat distortion temperature (D 648); flexural properties (D 790); and dielectric properties (D 150).

An important characteristic of each particular resin is its intrinsic viscosity (I.V.). The following quotation from Thorpe's Dictionary of Applied Chemistry, 4th Edition, gives a succinct definition of this term.

"In the field of high-polymer viscometry the following functions of the dynamic viscosity of the solution ($\eta$), of the pure solvent ($\eta_0$), and of the concentration, $c$, measured in different units by different workers but necessarily defined explicitly in all examples, are generally accepted:

"The relative viscosity of the solution ($\eta_r$) is given by $\eta_r = \eta/\eta_0$.

"The specific viscosity of the solution $\eta_{sp}$ is given by $\eta_{sp} = (\eta/\eta_0) - 1$ (This function is also called 'The relative increase of viscosity' and denoted by $\eta_s$.)

"The intrinsic viscosity of the solution $[\eta]$ is given by $$[\eta] = \lim_{c \to 0} (\eta_{sp}/c) = \lim_{c \to 0} (\log_e \eta_r/c)"$$

The solvent in which I.V. is determined can significantly affect the values obtained. Unless otherwise indicated, the intrinsic viscosities herein are determined in dimethoxyethane and given in units of deciliters per gram (dl./g.).

There is a fixed relationship between intrinsic viscosity and molecular weight, which has been expressed by Staudinger, Mark and Houwink as $$[\eta] = KM^a$$

where K and $a$ are the intercept and slope, respectively, of a log-log plot of $[\eta]$ versus M. This relationship is unique for each particular type of resin, since it is sensitive to resin structure and molecular weight distribution; these, in turn, are generally functions of the feed compounds and impurities present in the feed. In this relationship, K and $a$ generally are constant for a limited molecular weight range. The following are typical relationships determined for resins produced according to this invention, as illustrated in the following examples.

| Examples illustrating resin type | Applicable Range, $\overline{M_w} \times 10^{-4}$ | Relationship |
|---|---|---|
| 1–3, 5–8, 31 | 3 to 20 | $[\eta] = 0.0143 \overline{M_w}^{0.30}$ |
| 11, 24 | 7 to 65 | $[\eta] = 0.0705 \overline{M_w}^{0.145}$ |
| 36 | 6 to 35 | $[\eta] = 0.0930 \overline{M_w}^{0.12}$ |

Accordingly, I.V. values of 0.4 generally correspond to weight average molecular weights of about 50,000 to about 200,000 for the illustrated resins. At higher intrinsic viscosities, the correlation with molecular weight covers a much broader molecular weight range, depending on the particular constitution of the individual resin. For those prepared from pure p,p'-bisphenol A and its diglycidyl ether, for example, an I.V. of 1.0 corresponds to somewhat over 1,000,000. For those prepared from equivalent feeds of technical purities, I.V. values of 0.5 to 0.6 correspond to about 1,000,000 molecular weight.

In general, resins prepared according to this invention have intrinsic viscosities of at least 0.3 dl./g., usually between 0.35 and 1.0, and preferably between 0.35 and 0.55 if they are to be used for molding, and have weight average molecular weights of at least about 40,000 and usually between 50,000 and 1,000,000. Products of higher intrinsic viscosities and molecular weights can be made. Resins of this invention are mixtures of molecules of different molecular weights.

The invention will be better understood from the following examples. These examples are given for purposes of illustration only and the invention is not to be considered as limited by the reactants and conditions described in the examples.

*Example 1*

To a vessel containing methyl ethyl ketone are added substantially 100% pure p,p'-bisphenol A substantially 100% pure diglycidyl ether of p,p'-bisphenol A and 60% aqueous solution of benzyltrimethyl ammonium hydroxide in a molar ratio of 1.0:1.0:0.02. The mixture is made up to contain 67% by weight of active reactants. The solution is heated to reflux temperature, with stirring, and maintained at that temperature, about 80° C., for 13 hours. Chloroform is then added in an amount which decreases the concentration of reactants (including product) to 57% by weight. After 28 hours total time, additional chloroform is added in an amount which decreases the concentration of reactants to 50% by weight.

After a total reaction time of 57 hours the solution is cooled, an equal volume of chloroform added thereto, and the resultant solution washed twice with volumes of water equal to the volume of resin solution. The resin-rich phase is then stabilized in a vacuum oven at a temperature of 160° C. and 50 mm. mercury for six hours.

The stabilized resin is dissolved in dioxane to produce a solution of about 15% resin content and the solution poured as a fine stream into ten times its volume of cold water (0–15° C.) with vigorous agitation. This results in dissolving dioxane out of the resin solution into the aqueous phase and leaves the substantially solvent-free resin as a suspension of shreds or fibers. The resin is recovered by filtration and resuspended in an amount of cold water approximately the same as that employed in the previous step. The washed shreds are recovered by filtration and dried in a vacuum oven.

Shredded resin prepared in this manner has a softening range of 145–185° C. and an intrinsic viscosity of 0.35 to 0.45 dl./g.

The shredded dried resin is compression molded into discs. These discs withstand the maximum 160 inch-pounds of impact in the Gardner variable impact tester without breaking or cracking.

Example 2

A resin is prepared in a slight modification of the procedure of Example 1, using the same reagents, namely, pure p,p'-bisphenol A, pure diglycidyl ether of p,p'-bisphenol A, and as catalyst 60% aqueous benzyltrimethyl ammonium hydroxide. A solution containing 30% by weight of reactants in methyl ethyl ketone is prepared and reacted at a temperature of 78°–80° C. for a period of 40 hours. No additional solvent is added while reaction is in progress. The cooled reaction product mixture is diluted with an equal volume of chloroform, washed with water, and the resin-rich phase stabilized as in Example 1. The stabilized resin is dissolved in dioxane and poured into water under a high degree of agitation as described. The discs produced from the resin shreds by compression molding withstand the maximum impact of 160 inch-pounds in the Gardner variable impact tester without breaking or cracking and have a softening range of 155–186° C.

Example 3

Resin is prepared from an equimolar mixture of pure p,p'-bisphenol A and pure diglycidyl ether of p,p'-bisphenol A in a modification of the procedure of Example 1. Monosodium salt of p,p'-bisphenol A, in a concentration of 0.02 mol per mol of bisphenol A, is employed as catalyst. The amount of free bisphenol A employed is, therefore, 0.98 mol per mol of diglycidyl ether. The reactants are dissolved in methyl ethyl ketone to produce a solution consisting of 40% by weight of reactants. Reaction is carried out at 80° C. with stirring for 108 hours. Washing, stabilization, shredding, and drying steps are carried out according to the procedure described in Example 1, with the exception that acetic acid is added during the water washing of the resin solution. One mol of acid is added for each mol of sodium ion present.

Resin prepared in this manner has a softening range of 255–310° C. and an intrinsic viscosity of 0.85–1.2 dl./g. Compression molded discs of the resin withstand the maximum 160 inch-pounds of impact in the Gardner variable impact tester without breaking or cracking.

Example 4

A portion of the stabilized reaction product of Example 3 is dissolved in ethylene glycol monomethyl ether to produce a solution containing 7 percent by weight resin. This solution is poured as a fine stream into seven times its volume of acetone with vigorous agitation. The solvent-rich phase is decanted and the resin is agitated vigorously with normal hexane equalling in volume that of the acetone used previously. The resultant resin shreds are dried in a vacuum oven. By this procedure, about 13% of the original resin remains in solution and the resin shreds represent 87% of the original resin. The fraction remaining in solution consists of the lowest molecular weight components. Compression molded discs of the resin withstand the maximum 160 inch-pounds of impact in the Gardner variable impact tester without breaking or cracking.

Example 5

A resin is prepared from an equimolar mixture of pure p,p'-bisphenol A and pure diglycidyl ether of p,p'-bisphenol A. In this instance, the catalyst employed is potassium hydroxide, added as a concentrated aqueous solution in an amount equivalent to 0.044 mol KOH per mol of bisphenol A. The reagents are dissolved in methyl ethyl ketone to produce a solution containing 37.8% of reactants. The reaction is carried out at 75 p.s.i.a. pressure at a temperature of 140° C. for 1.5 hours. No additional solvent is added during the reaction or prior to the washing step. The reaction mixture is washed with a mixture of water, methyl ethyl ketone and $CO_2$, the latter in sufficient amount to neutralize the catalyst. The mixture is stabilized, the stabilized resin dissolved in dioxane and shredded resin recovered as described in Example 1. Compression molded discs of this resin withstand the maximum impact of 160 inch-pounds in the Gardner variable impact tester and have a softening range of 145° to above 150° C.

Example 6

A resin is prepared from one mole of pure diglycidyl ether of p,p'-bisphenol A, and 0.95 mol of pure p,p'-bisphenol A, using as catalyst 0.05 mol of the monosodium salt of p,p'-bisphenol A. The reactants are dissolved in methyl ethyl ketone to produce a solution containing 40% by weight of reactants. The reaction time is 38 hours at 80° C. Dioxane is added after completion of the reaction. The reaction mixture is not separately washed as such. A mixture of dioxane and methyl ethyl ketone is added to the total reaction mixture and the resulting solution poured under vigorous agitation into cold water containing sufficient acetic acid to neutralize the catalyst. The resulting shredded resin is washed and dried. Compression molded discs prepared therefrom withstand the maximum impact of 160 inch-pounds in the Gardner variable impact tester and have a softening range of 165°–195° C.

Example 7

A resin is prepared from pure p,p'-bisphenol A and pure diglycidyl ether of p,p'-bisphenol A by dissolving 1.0 mol of the ether, 0.9 mol of the free phenol, and 0.1 mol of monosodium salt of p,p'-bisphenol A in methyl ethyl ketone to produce a solution containing 40% of reactants. The reaction is carried out for 16 hours at 80° C. After completion of the reaction ethylene glycol monomethyl ether is added in place of the dioxane of Example 6. As in Example 6, the reaction mixture is not washed. Solid resin is recovered by adding a mixture of ethylene glycol monomethyl ether and methyl ethyl ketone and pouring the resulting solution into a mixture of water and acetic acid under vigorous agitation. The resulting shredded resin is recovered and dried. Compression molded discs thereof withstand an impact of 160 inch-pounds in the Gardner variable impact tester and have a softening range of 180–205° C.

Example 8

A resin is prepared from pure p,p'-bisphenol A and pure diglycidyl ether of p,p'-bisphenol A, using as catalyst monosodium salt of bisphenol A. The reactants are employed in a ratio of 0.98 mol of free phenol per mol of ether, with 0.02 mol of catalyst. The reactants are dissolved in ethylene glycol monomethyl ether to produce a solution containing 50% by weight of reactants. The reaction is carried out for 22 hours at a temperature of 100° C. During the course of the reaction chloroform is added as additional solvent, finally reducing the concentration of reactants (including product) to 30% of the total reaction mixture. After completion of the reaction, the reaction mixture is washed with an aqueous solution of acetic acid in the manner described in Example 3 and is stabilized. The resulting stabilized resin is dissolved in an additional amount of ethylene glycol monomethyl ether and poured as a thin stream into an agitated mass of cold water as described in Example 1.

A compression molded disc prepared from the resulting shredded product has an extremely low impact resistance of less than 4 inch-pounds in the Gardner variable impact tester. Example 9, below, illustrates that the low impact resistance of this product is due to the presence of a substantial amount of material of excessively low molecular weight in the reaction product.

Example 9

A reaction mixture is prepared, washed and stabilized in a manner identical to Example 8. The stabilized resin is dissolved in 10 ml. of ethylene glycol monomethyl ether per gram of resin and the resultant solution poured with vigorous stirring into ten times its volume of a 5:2 volume mixture of acetone and n-hexane. The resulting resin-rich liquid phase is separated, diluted with about five volumes of ethylene glycol monomethyl ether and poured under vigorous agitation into ten times its volume of cold water (0–5° C.). Resin shreds are thus formed; they are dried in a vacuum oven. The resin obtained in this manner contains only about 75% by weight of the original stabilized resin. The amount removed is low molecular weight material. Compression molded discs of the recovered higher molecular weight portion of the resin withstand 160 inch-pounds of impact in the Gardner variable impact tester without breaking or cracking and have a softening range of 140–160° C.

Example 10

Resin is prepared from a mixture of 99.7% pure p,p'-bisphenol A and substantially 100% pure diglycidyl ether of p,p'-bisphenol A. The catalyst employed is the monosodium salt of p,p'-bisphenol A in a concentration of 0.04 mol per mol of bisphenol. The reactants are employed in a ratio of 1.00 mol of the ether per 0.96 mols of free bisphenol, in 30% by weight solution in methyl ethyl ketone. The reaction is carried out for 6.5 hours at 120° C. Shredded resin reaction product is recovered in a manner similar to Example 3.

Resin produced in this manner has a melting range of approximately 140–160° C. and an intrinsic viscosity of 0.4 dl./g., measured in dimethoxyethane. Its weight average molecular weight is greater than 100,000. When the procedure is modified by increasing the reaction time, resins having a high intrinsic viscosity, up to 1.1 and melting range, up to 300° C. are produced. Compression molded specimens of the resin of 0.4 I.V. easily withstand an impact of 160 inch-pounds in the Gardner variable impact tester.

Example 11

A resin is prepared from a standard technical grade of bisphenol A, a commercial product which contains about 92 to 96.5% of p,p'-bisphenol A, and from a commercial reaction product of the same grade of bisphenol with epichlorohydrin, which reaction product contains about 70–80% of the pure diglycidyl ether of p,p'-bisphenol A, the remainder being mostly higher condensation products. The content of phenolic hydroxyl groups of the bisphenol and of epoxy groups of the ether are determined by standard tests. The reaction mixture is made up to contain one equivalent of epoxide functionality to one equivalent of phenolic functionality, including in the latter the amount of phenol present in the catalyst. The catalyst is 0.05 mol of the monosodium salt of p,p'-bisphenol A per mol of bisphenol in the reaction mixture. The total reactants are present in a concentration of 40% by weight in methyl ethyl ketone. The reaction temperature is 78° C. and the reaction time 72 hours. Resin is recovered by diluting the reaction mixture with an equal weight of dioxane and pouring the solution with vigorous agitation into ten volumes of ice water containing some excess of acetic acid over that required to neutralize the catalyst. The resin shreds are washed with water and dried for 16 hours at 100° C. in a blower oven.

The product is molded into discs at 160° C. and 1,000 p.s.i. After aging overnight the discs withstand 160 inch-pounds of impact in the Gardner variable impact tester without breaking or cracking.

Example 12

A resin is prepared similarly to Example 3 except that the reactants are used in the ratio of 1.05 mol of the diglycidyl ether of bisphenol A per 1.00 mol of bisphenol A (including bisphenol in the catalyst). The resulting reaction product is a gel, formed through reaction of the epoxide groups with alcoholic groups along the chain, rather than a linear resin.

Another resin is prepared similarly to Example 3, but using a reactant ratio of 1.05 mol of bisphenol per mol of diglycidyl ether of bisphenol. The reaction product is a resin having a much lower molecular weight than otherwise obtained, and having unsatisfactory impact resistance.

Example 13

The following illustrates a method for preparing resin according to this invention which is particularly suitable for production on a larger scale. A mixture of a dihydric phenol and diglycidyl ether in a molar ratio of 1.00 to 1.00 is prepared in solution in a suitable solvent such as methyl ethyl ketone. The reactant concentration is suitably 40% by weight. As catalyst there is used 0.02 mol sodium hydroxide per mol of dihydric phenol, added in the form of 45% aqueous solution. The reaction mixture is placed in a closed vessel having reflux means and sampling means and is brought to a temperature of 120° C. The viscosity of the reaction mixture is determined on samples which are taken either continuously or periodically; commercially available viscosity determining apparatus is used. The viscosity of the reaction mixture at any given time can be correlated with the intrinsic viscosity of the resin produced up to that time. For this purpose one employs a calibrating curve, conveniently produced in known manner from a series of preliminary small scale laboratory tests. When the viscosity of the reactant solution has reached a value which corresponds to the desired intrinsic viscosity of the product, the reaction is stopped by adding sufficient carbon dioxide to the reaction mixture to neutralize the sodium hydroxide present. $CO_2$ is conveniently added by merely pressuring the required amount into the gas space of the reactor and permitting the stirring action to carry it into the reaction mixture. If desired, it may also be injected directly into the liquid mixture. Another acid could be employed, e.g., HCl. This might create corrosion problems while not providing any advantages over the use of $CO_2$.

In a series of illustrative experiments the desired intrinsic viscosity was 0.30 and the actual intrinsic viscosities of the resins produced in this manner varied by no more than 0.02 unit from the target value. The reaction times required to produce the desired resin range from 4.8 to 5 hours. After $CO_2$ has been added there is no additional significant amount of reaction even though the elevated temperature is maintained for a considerable time thereafter. The resin is recovered from the reaction mixture in a manner similar to Example 1. The resin produced according to this procedure withstands 160 inch-pounds when tested by the Gardner variable impact tester.

Example 14

In a manner similar to Example 13, resin is prepared from technical bisphenol A (as used in Example 11) and a concentrate of diglycidyl ether of p,p'-bisphenol A obtained by distillation of the technical grade of the polyglycidyl ether of bisphenol A referred to in Example 11. The reaction carried out as described in Example 13 is completed in 12.75 hours and results in a product having an intrinsic viscosity of 0.29. About 50% of the catalyst is lost by reaction with the 0.1% by weight saponifiable chlorine in the glycidyl ether. Accordingly, the amount of catalyst used should be adjusted by adding sufficient additional sodium hydroxide to react with saponifiable chlorine present in the reaction mixture.

Example 15

In the production of resins in accordance with Example 13, part of the neutralized catalyst tends to remain in the final resin as sodium bicarbonate or carbonate. This residue is not generally objectionable. However, it may be removed to a level of less than 0.1 milliquivalent per 100 grams resin by washing the resin solution, after dilution with additional methyl ethyl ketone to a resin content of 20%, twice with one half volume of water saturated with methyl ethyl ketone at room temperature. Wash and resin solution are separated by centrifuging or by settling, preferably at an elevated temperature, e.g., 60–70° C.

Catalyst residue may be unobjectionable when it remains dissolved in the resin solution. Residues are generally soluble when the catalyst is potassium hydroxide or when the neutralizing acid is an organic acid, e.g., acetic acid.

Example 16

In the production of resins according to this invention the resin remains in solution throughout the reaction period. Solid resin is recovered by precipitation from the reaction solutions with simultaneous solvent removal. A preferred method of precipitation is by pouring the resin solution under strong agitation into a large mass of liquid, such as water, which is a non-solvent for the resin and a solvent for the solvent in which the resin has been dissolved.

It has been found that methyl ethyl ketone, which is a preferred solvent for use in the reaction step, has a peculiar solubility relationship with the resin produced according to the invention. One peculiarity consists in the fact that a solution containing on the order of 30 to 40% or more of resin, the remainder being methyl ethyl ketone, consists of a single phase at temperatures in the range in which washing and recovery are carried out, while addition of more methyl ethyl ketone to reduce the resin content of the solution to about 20% by weight causes a separation into two phases, one containing mainly methyl ethyl ketone and the other mainly resin. For this reason it was considered necessary to carry out the required dilution of the reaction solution with a superior solvent for the resin, e.g., dioxane. This, of course, is an expensive step in a commercial process.

It was surprisingly found that when as little as 1 to 3% by weight of water is added to methyl ethyl ketone employed for diluting the solution of resin in methyl ethyl ketone, then the resulting mixture remains as a single liquid phase and can be worked up equally as well as a methyl ethyl ketone-dioxane solution.

Taking advantage of this finding, therefore, a useful method for preparing resins according to this invention is as follows:

A reaction mixture is prepared and heated to reaction temperature. The viscosity of the reaction mixture is determined continuously or intermittently and compared with a calibration curve. When the reaction mixture has achieved a predetermined viscosity corresponding to a desired intrinsic viscosity of the reaction product, e.g., about 0.3 dl./g., $CO_2$ is added to the reaction mixture in some excess over the amount required to neutralize the sodium hydroxide catalyst therein. The reaction mixture is diluted to a resin content of about 20% by weight by adding thereto a solution of 1 to 3% by weight of water in methyl ethyl ketone, washed twice with one-half volume of water saturated with methyl ethyl ketone, and then poured under vigorous agitation into ten times its volume of cold water. The resulting resin shreds are filtered and dried.

Example 17

It is known that with some resins the retention of small amounts of low molecular weight material results in substantial loss of impact resistance. In a series of tests of resins prepared according to Example 13 it was found that the impact resistance of the resin was not affected by variations of water content in the range from 0 to 1% by weight of the resin. However, resins containing more than 0.1% by weight of methyl ethyl ketone consistently showed poor impact resistance while those containing less than 0.05% methyl ethyl ketone showed good impact resistance. Resins containing methyl ethyl ketone in the range between 0.05 and 0.1% by weight gave erratic results on impact tests.

These results emphasize the importance, when carrying out the resin preparation in solution, of complete removal of organic solvent from resin in the resin precipitation and drying step when a resin of high impact resistance is desired.

Example 18

A resin is prepared in the manner similar to Example 3 from a reaction mixture containing 40% by weight reactants in methyl ethyl ketone solvent, the reactants consisting of equimolar parts of p,p'-bisphenol A (adjusted for phenol content of the catalyst) and diglycidyl ether of p,p'-bisphenol A and the catalyst being 0.025 mol per mol of phenol of the monosodium salt of p,p'-bisphenol A. The reaction time is 65 hours at 78° C. Shredded resin is recovered as in Example 1, i.e., without neutralization of the alkaline catalyst.

A portion of dried shredded resin produced as described was compression molded and tested immediately after it was produced. Another portion of the resin was stored for three months. It was observed that on three months' storage at room temperature additional reaction had taken place.

Comparison of the properties of the resin showed that the intrinsic viscosity had increased from 0.33 to 0.46 and the softening range from 140°–170° C. to 200°–255° C. The epoxide content of the resin had decreased from 0.008 to 0.003 equivalents per 100 grams resin and the Izod impact resistance, expressed as ft.-lb./in. notch had increased from values of 1.5–1.6, tested on two specimens, to the following results on four specimens tested: 1.5, 16.1, 16.4 and 22.1.

Example 19

Commercially produced bisphenol A frequently contains a tris-phenolic component, specifically 2,4-bis($\alpha,\alpha$-dimethyl-p-hydroxybenzyl)phenol. A resin is prepared in which the reaction mixture consists of pure diglycidyl ether of p,p'-bisphenol A and sufficient of the above mentioned trisphenol to provide 4.4% of the initial phenolic hydroxyl functionality. The reaction is carried out substantially as in Example 13. It is found that the time required to reach the requisite reaction mixture viscosity is shorter than in said example. The resin is recovered as in Example 13. It is found, when compared with a resin of the same intrinsic viscosity prepared from the pure bisphenol and diglycidyl ether of bisphenol to have substantially identical notched Izod impact resistance, a substantially higher softening range (284–313° C.), and a higher heat distortion temperature (92.5° C.).

Example 20

The solubility of the resins of this invention is greater in dimethoxymethane than in methyl ethyl ketone. Consequently, when it is desired to produce a resin of a relatively high intrinsic viscosity the reaction is more conveniently carried out in dimethoxyethane since this avoids the production of an excessively viscous solution and the possibility of phase separation.

A reaction for the production of a resin of a relatively high intrinsic viscosity is carried out by reacting pure diglycidyl ether of p,p'-bisphenol A and pure p,p'-bisphenol A at a diepoxide to total phenol molar ratio of 1.0:1.0, using as catalyst 0.013 mol of monosodium salt of bisphenol per mol of bisphenol A. The reactants are placed in dimethoxy ethane to provide a solution containing 40% by weight of the reactants. Water concentration in the solution is 0.03% by weight. The reaction is carried out at reflux for 17.5 hours at which time the viscosity of the solution indicates the resin to have an intrinsic viscosity of 0.55 dl./g. At this point, stirring is limited by the high viscosity of the solution. The reaction mixture is diluted to about 20% by weight reactants by adding additional dimethoxyethane. The run is terminated after 11 more hours when the leveling off of change in solution viscosity indicates that the reaction rate has become very low. The solution is washed and resin is recovered as in Example 1.

On testing a number of specimens prepared by molding dried resin fiber produced as described, it was found that four out of six bars tested had an Izod impact resistance of 20 ft.-lbs./in. notch and showed ductile breaks and two specimens had an Izod impact resistance of 4.5 ft.-lbs./in. notch and showed brittle breaks.

A portion of the wet resin fibers was dried and mixed by processing on a two-roll mill. Specimens molded from this material showed similar results on impact testing to the specimens produced by molding the resin fiber.

Example 21

The method of Example 20 is repeated with the exception that the water content of the reaction mixture is increased from 0.03 to 1.0% by weight. This increase in water content results in a nearly ten-fold increase in alpha glycol formation, the major portion of this increase occurring within the first twelve hours of the reaction. Under the reaction conditions, the alpha glycol end group reacts very slowly, if at all, with epoxide functionality and hence the glycol acts as a chain terminator. It is also observed that the rate of disappearance of phenolic hydroxyl functionality in the system containing 1.0% water is only one-half to one-third that in the reaction containing 0.03% by weight of water. It is evident from these results that increasing the water content of the reaction system not only reduces the ultimate attainable molecular weigh of the resin but also significantly reduces the rate of reaction.

Example 22

Although it is desirable to carry out the reaction between bisphenol and diglycidyl ether with agitation, it is also possible to obtain satisfactory results when the reaction is carried out in a suitable system without agitation. In an experiment made at the conditions of Example 20, but without stirring, it is found that the reaction rate is about half as fast as that in the stirred system, based on disappearance of phenolic hydroxyl groups. The unstirred reaction is suitably conducted in a sealed glass-lined vessel completely submerged in a bath which maintains a temperature of 120° C.

Example 23

A large sample of resin is prepared from 99.7% p,p'-bisphenol A and pure diglycidyl ether of p,p'-bisphenol A at 120° C. at a catalyst level of 0.02 mol sodium hydroxide per mol of bisphenol A, a reactant molar ratio of 0.995 diglycidyl ether of bisphenol A per 1.00 of bisphenol A and an initial concentration of reactants of 40% by weight in methyl ethyl ketone. The resin is recovered in shredded form according to Example 3.

The resin is fractionated to produce five portions of successively higher narrow molecular weight ranges by dissolving the resin in monomethyl ether of ethylene glycol to produce a 5% by weight solution and precipitating successive fractions therefrom by successive additions of acetone. Each fraction is recovered from the resulting resin-rich phase by precipitation with water under rapid, strong agitation and dried at 170° C. for 48 hours. The fractions range from 0.3 to slightly over 1.0 in intrinsic viscosity; the intrinsic viscosity of the whole polymer is 0.77. Prior to molding, the fibrous materials are milled at 190° C. for five minutes, except the lightest fraction, which is milled at 100° C. for five minutes.

Izod impact bars were prepared by compression molding of samples prepared as described. In testing the notched bars, it was found that the lowest molecular weight fraction, which had an intrinsic viscosity of 0.3, fractured only in the brittle manner and showed consistently low values. The remaining fractions whose intrinsic viscosity was in the range from 0.5 to 1.0 exhibited both brittle and ductile break.

In testing of the unnotched bars, all samples fractured with a ductile break and had values in the range from 30 to 50 ft.-lb./in. of width.

For purpose of comparison with the above sample which were tested after milling, specimens were also prepared from an unmilled portion of a fraction having an intrinsic viscosity of 0.3 and a fraction having an intrinsic viscosity of 0.8. The tests on these samples agreed with the tests on the milled samples, showing that milling did not affect the impact resistance of the molded specimens.

To investigate the effect on Izod impact behavior of low molecular weight components present in low concentration, a prorated blend was reconstituted from the above fractions, omitting the fraction of lowest molecular weight. The impact values for the reconsituted sample were similar to those for the whole polymer.

Example 24

For reasons of economy it is desirable to produce linear resins in accordance with this invention from commercially available grades of phenols and diglycidyl ethers. In accordance with this objective, a preparation is made using a commercial grade of bisphenol A and a commercial grade of condensation product of epichlorohydrin and commercial grade bisphenol A, containing 70–80% of the diglycidyl ether of p,p'-bisphenol A. The reactants are used in a ratio which provides 0.992 epoxide equivalents per 1.00 phenolic hydroxyl equivalents. The catalyst is added at a 45% aqueous solution of soduim hydroxide in sufficient amount to provide the amount of sodium hydroxide required to react with the saponifiable chlorine content of the polyepoxide as well as 0.0125 mol of sodium hydroxide per equivalent of phenolic hydroxyl group. For a saponifiable chlorine content of the polyepoxy reactant of 0.8% by weight, the total amount of sodium hydroxide required is found to be 0.0166 mol per mol of phenol. In determining the epoxy group equivalency, the saponifiable chlorine is also considered equivalent to the proportionate amount of epoxy groups since it is converted thereto in the course of the reaction. The reaction is carried out with 40% by weight of reactants in methyl ethyl ketone at 120° C. reaction temperature. The reaction is discontinued by adding an excess of $CO_2$ after the desired viscosity has been attained.

In multiple preparations, it is found that the reaction time required to attain a desired viscosity varies widely even though the reactants employed are quite similar. However, the resins produced by the reactions have substantially identical properties.

Example 25

A resin is prepared according to Example 13. The neutralized resin solution is twice washed with one half its volume of water. The washed solution, free of water, is gradually poured onto the upper roll of a two roll mill operating at an elevated temperature. Solvent is guickly evaporated and the solvent-free resin sheeted off. Compression molded discs of the resin resist 160 in.-lb. of impact in the Gardner variable impact tester.

Example 26

Examples 2 and 13 are repeated, substituting for the bisphenol A bis(4-hydroxyphenyl)methylphenylmethane and using as solvent a mixture of MEK and dioxane. The resulting resin has equally good impact resistance, tested on the Gardner variable impact tester, and has a higher heat distortion temperature.

Example 27

Examples 2 and 13 are repeated, substituting for the bisphenol A bis(4-hydroxyphenyl)methylphenylmethane, for the diglycidyl ether bis(2,3-epoxypropoxyphenyl) methylphenylmethane and using as solvent a mixture of MEK and dioxane. The resin has good impact resistance.

Example 28

Example 2 is repeated, substituting for the diglycidyl ether bis(2,3-epoxypropoxyphenyl)methylphenylmethane. The resulting resin has good impact resistance.

Example 29

Example 13 is repeated, substituting for the bisphenol an equal molecular proportion of 2,2-bis(3,5-dichloro-4-hydroxyphenyl)propane. The resulting linear polymer has a heat distortion temperature of 104° C. and good impact resistance.

Example 30

Examples 2 and 13 are repeated with a variety of bisphenols substituted for bisphenol A. Resins of good impact resistance are produced, for example, with bis(4-hydroxyphenyl)methane, 1,1 - bis(4 - hydroxyphenyl) ethane, 2,2 - bis(4 - hydroxyphenyl)butane, 2,2-bis(4-hydroxyphenyl)nonadecane, bis(4 - hydroxyphenyl)diphenylmethane. Similarly, resins of good impact resistance are produced by the reaction of the above and of p,p'-bisphenol A with diglycidyl ethers of the respective phenols and with diepoxybutane, 1,2-epoxy-7,8-epoxyoctane, diglycidyl ether and diglycidyl ether of ethylene glycol.

Example 31

Resin is prepared from a 40% by weight solution of pure p,p'-bisphenol A and diglycidyl ether of p,p'-bisphenol A in methyl ethyl ketone. The ratio of epoxide to phenolic hydroxy equivalent is 1.0:1.0. Catalyst is 0.02 mol of NaOH per mol of bisphenol A, added as a 45 percent wt. aqueous solution. The reaction is carried out at 120° C. and terminated by addition of excess carbon dioxide after the desired viscosity is attained. The sodium content of the crude product solution is reduced below 0.1 miliequivalent per 100 grams resin by two washes with one half volume of methyl ethyl ketone saturated with water. The resin is precipitated from solution with cold water under rapid agitation. After centrifuging, the wet resin shreds are dried in a forced draft oven at 80–90° C. for at least 24 hours. In two typical preparations according to this method the following resin product properties are observed:

|  | Resin Batch No. 1 | Resin Batch No. 2 |
|---|---|---|
| Intrinsic viscosity | 0.37 | 0.34 |
| Epoxide, eq./100 g. | 0.0051 | 0.0053 |
| Phenolic Hydroxyl, eq./100 g. | 0.012 | 0.011 |
| Alkalinity, meq./100 g. | 0.04 | 0.04 |
| Secondary Hydroxyl, eq./100 g. | 0.331 | 0.332 |
| Methyl Ethyl Ketone, percent wt. | 0.08 | 0.08 |
| Water, percent wt. | 0.8 | 0.5 |
| Total Chlorine, percent wt. | 0.03 | 0.02 |
| Inorganic Chloride, percent wt. | 0.0035 | 0.0014 |
| Ash, percent wt. | 0.02 | 0.01 |
| Heat Distortion Temperature (264 p.s.i.), ° C. | 89 | 86 |
| Vicat Softening Point, ° C. | 100.2 | 96.5 |
| Impact Strength, Notched Izod, ft.-lb./in. Notch (⅛" bar) (Average) | 1.4 | 1.5 |
| Impact Strength, Unnotched Izod ft.-lb./in. (Average) | 93 | 106 |

Test samples were prepared from batch No. 1 above by injection molding. Various properties were determined on the samples, both in the unannealed state and in samples annealed 24 hours at 71° C. All samples were equilibrated at approximately 70° F. prior to testing.

Injection molding was carried out with a cylinder temperature of 585° F. The flow properties of the sample were satisfactory at these conditions. It was found on the other hand that a commercial polycarbonate resin proved extremely difficult to mold even at the limiting conditions of 20,000 p.s.i. injection pressure (maximum machine pressure) and 600° F. cylinder temperature which are recommended by its manufacturer. It was observed that signs of darkening were evident when the polycarbonate resin was molded at this temperature using cycle times of 3 to 5 minutes while no signs of darkening were noted during molding at 585° F. of the resin produced according to this invention.

The following tabulation shows the results of tests on the annealed and unannealed injection molded samples and for comparison typical values reported in the literature for polycarbonate resin:

|  | This Invention | | Polycarbonate Unannealed |
|---|---|---|---|
|  | Unannealed | Annealed 24 hrs. at 71° C. |  |
| Tensile Yield (2.0 in./min.), p.s.i. | 9,300–9,400 | 12,200–12,400 | 8–9,000 |
| Elongation (2.0 in./min.), percent | 88–150 | 5–8 | 60–100 |
| Tensile Modulus, p.s.i.×10⁵ | 3.5 | 3.8 | 3.2 |
| Flexural Strength, p.s.i. | 16,700 | 18,800 | 11–13,000 |
| Flexural Modulus, p.s.i.×10⁵ | 4.1 | 4.37 | 3.75 |
| Notched Izod Impact Resistance, ft.-lb./in. Notch (⅛" bar) | 2.2–2.6 | 1.3 | 12–16 |
| Unnotched Izod Impact Resistance, ft.-lb./in. Width (0.5" bar) | 57–67 | 62–63 | 60 |
| Tensile impact, ft.-lb./in. | 515–875 | 250–520 | 600–900 |
| Heat Distortion Temperature, ° C.: |  |  |  |
| 264 p.s.i. | 81 | 92 | 138–143 |
| 66 p.s.i. | 89 | 94 | 139–145 |
| Hardness, Rockwell | M57 | M72 | M70 |

In a comparison of the unannealed resin with polycarbonate the following can be observed: The tensile properties of the resin of this invention are very similar to the polycarbonate, its flexural strength is about 50% higher and the tensile modulus about 10% higher. The impact resistance is equivalent when testing the unnotched Izod impact bars, but shows a lower value for the resin of this invention when testing the notched bars. These specimens showed a brittle fracture. However, as has been pointed out above, the impact test on the notched bar is not entirely indicative of the impact resistance of the samples of this particular resin when the fracture occurs as a so-called brittle break, since it has been found that even these samples have a substantial degree of elasticity.

Annealing the resin at 71° C. (approximately 25° F. below the heat distortion temperature) for 24 hours appears to make the resin harder and more brittle. The tensile and flexural properties increase along with the heat distortion temperature while elongaton and impact strength decrease. The unnotched Izod impact resistance was not changed appreciably on annealing.

The electrical properties of a portion of Batch No. 2 of this example were determined on annealed and unannealed samples. The following properties were found. For comparison, the values reported for commercial polycarbonate resin are also given.

|  | This Invention | | Polycarbonate Unannealed |
|---|---|---|---|
|  | Unannealed | Annealed 24 hrs. at 71° C. |  |
| Dielectric Constant, $10^3$ c.p.s. | 4.07 | 4.00 | 3.02 |
| Power Factor, percent, $10^3$ c.p.s. | 0.19 | 0.16 | 0.11 |
| Volume Resistivity, ohm-cm. $\times 10^{16}$ | 4.88 | 3.69 | 2.1 |

*Example 32*

A number of tests were carried out on portions of resin prepared according to Example 10. Average values of various properties were determined. It was found that the specimens had an ultimate tensile strength of 8,500–10,000 p.s.i.; a tensile modulus of 300,000 to 600,000; elongation at break of 50–60 percent; Rockwell hardness of M61–M63; and a heat distortion temperature of 87–93° C.

The Izod impact strength of notched specimen bars was found to cover a range from 2.5 to 32.0 ft.-lb./in. notch. Low values corresponded to brittle breaks and high values to ductile breaks. Both compression and injection moldings were tested. Multiple specimens prepared from a single lot of material molded under identical conditions showed both types of fracture.

A portion of resin prepared as described, having the properties given above, was retained for about four months and tested for the same and additional properties. The retested sample had an intrinsic viscosity of 0.35 dl./g. and contained 2.1 milliequivalents of base per 100 grams of resin and 0.008% by weight methyl ethyl ketone. The sample had a yield strength of 10,000 p.s.i., an ultimate tensile strength of 7,200 p.s.i., a tensile modulus of 636,000 p.s.i., an elongation at break of 60–70% (estimated), Rockwell hardness of M61, a heat distortion temperature of 86° C., and an average Izod impact resistance of 10 ft.–lb./inch of notch. Individual specimens had Izod impact resistance values in the range from 2.4 to 32 ft.–lb./inch of notch.

The higher impact resistance values of these specimens are twice as high as the impact resistance of commercial polycarbonate resin.

Compression molded disc specimens of the resin prepared according to this example were tested for chemical resistance. It was found that when the discs were exposed to various liquids at 100° C. for 24 hours no chemical degradation occurred with water, 5% and 25% aqueous sulfuric acid, 5% and 25% aqueous sodium hydroxide, 5% aqueous acetic acid, 25% aqueous sodium chloride and 5% sodium methoxide in methanol.

*Example 33*

The chemical resistance of a series of specimens prepared in the manner of Example 13 was tested by immersing molded discs, 0.125 inch thick and two inches in diameter, in various solvents and reagents for seven days at 25° C. (ASTM method D 545–56 T). The samples exhibited excellent resistance toward caustic soda, acids and some solvents. No chemical degradation was observed in any of the tests; however, in some instances swelling was found. The data are summarized as follows:

*Excellent resistance.*—(No change in thickness or width; weight gain less than 0.4%)
Sulfuric acid (10 and 30 percent wt.)
Nitric acid (10 percent wt.)
Sodium hydroxide (3 and 10 percent wt.)
Sodium chloride (10 percent wt.)
Hydrogen peroxide (8 percent wt.)
Ethanol (50 percent vol.)
Carbon tetrachloride
Heptane
*Fair resistance.*—(Weight, width, and thickness gain, each less than 5%)
Ethanol (95%), Phenol (5%)

*Poor resistance.*—(5–10% gain in weight)
Toluene
*No resistance.*—(Physical structure of disc destroyed)
Acetone, ethylene chloride

*Example 34*

In a test of the adhesive properties of resins prepared according to Example 13, a quantity of resin shreds sufficient to form a thin film is sprinkled between two aluminum plates previously cleaned with chromic acid. The plates are pressed together at 200° C. under 9,000 to 18,500 p.s.i. The tensile shear strength at room temperature of the resulting bonds ranges from 2300 to 2750 p.s.i.

*Example 35*

In further tests of adhesive properties, a cement consisting of a 40 percent solution of the resin of Example 24 is used to bond a variety of surfaces. In each case, the cement is applied from a tube to a one square inch area on each panel, and the cemented areas are clamped together with 10–12 p.s.i. pressure. The samples are dried at conditions varying from 24 to 72 hours at room temperature or 15 minutes at 200° C. The resultant glue lines are two to three mils thick.

The tensile shear strength, tested at a load application rate of 600–700 p.s.i. per minute, for samples dried at ambient temperatures is shown below.

| Substrate | Drying Time (Hrs.) | Tensile Shear Strength, p.s.i. |
|---|---|---|
| Oak-Oak | 24 | 325–480 |
| Do | 72 | 355–520 |
| Redwood-Redwood | 72 | 475–725 |
| Rubber-Rubber | 72 | 45–60 |
| Ceramic-Ceramic | 72 | (¹) |
| Leather-Leather | 72 | 60–75 |
| Polymethylmethacrylate-Polymethylmethacrylate | 72 | 125–175 |
| Redwood-Steel | 72 | 400–575 |

¹ Substrate broke before bond.

Applying a 40% solution of the same resin in dichloromethane results in still stronger bonds in oak-oak substrates. Similarly strong bonds are produced in oak with a solvent free polymer.

Results of bonding metal-metal substrates demonstrate the need for an elevated baking temperature for best results. With 15 minutes baking time at 200° C., bond strengths are Steel-Steel _____ 1350–1465
Aluminum-Aluminum _____ 2000–2600

Equally strong bonds are obtained by using in lieu of resin cement a solvent-free pre-formed sheet of the same resin.

Similarly strong bonds are obtained by using the resins of Examples 26–29.

Example 36

A resin is prepared from a standard technical grade of bisphenol A, a commercial product which contains about 96.5% of p,p'-bisphenol A, and from an epoxyether which is a commercial reaction product of the same grade of bisphenol with epichlorohydrin, which reaction product has a Durrans' mercury melting point of about 70° C., a number average molecular weight of about 900 and an epoxy equivalence of about 0.20 equivalents per 100 grams. The content of phenolic hydroxyl groups of the bisphenol and of epoxy groups of the epoxy ether are determined by standard tests. The reaction mixture is made up to contain 1.01 equivalent of epoxide functionality to 1.00 equivalent of phenolic hydroxyl group. The catalyst is 0.15% by weight of sodium hydroxide based on the total reactants charged. It is added in the form of 45% aqueous sodium hydroxide. The reaction mixture of bisphenol and epoxy ether is dissolved in methyl ethyl ketone to make a 40% by weight reactant solution. The reaction is carried out at 130° C. for a time of about 6 hours. The end of the reaction period is determined by measuring the intrinsic viscosity of the mixture and comparing it with a previously prepared calibration scale obtained with identical reactants at similar conditions. When the desired intrinsic viscosity has been obtained the reaction mixture is neutralized by adding gaseous carbon dioxide. Additional methyl ethyl ketone is then added to reduce the resin concentration to 20% by weight. This solution is washed with water which is saturated with MEK to remove the neutralized catalyst. The desired solid resin is recovered from the neutralized wash solution by pouring one volume of the solution with vigorous agitation into ten volumes of ice water. The resulting resin threads are washed with water and dried for 16 hours at 100° C. in a blower oven.

The product is molded into discs at 160° C. and 1000 p.s.i. After aging overnight the discs withstand 160 inch pounds of impact in the Gardner variable impact tester without breaking or cracking.

Example 37

Washed reaction mixture from Example 36 is sent to a flashing operation wherein MEK is added to give a water-to-MEK ratio of 0.11 or less, and the water-MEK azeotrope is removed by distillation until dry solution of resin in MEK remains as bottoms. This solution of resin in MEK is useful for preparing surface coatings.

Example 38

Portions of the resin prepared according to Example 36 were compression molded and subjected to analysis and performance tests. The following table lists the results of these tests.

Analytical properties:
  Intrinsic viscosity, dl./g. _____ 0.42
  Molecular weight (weight average) _____ 227,000
  Epoxide content, eq./100 g. _____ 0.002
  Phenolic hydroxyl, eq./100 g. _____ <0.002
  α-Glycol, eq./100 g. _____ 0.018
  Secondary hydroxyl, eq./100 g. _____ 0.350
  Cyclic 2:2 components, percent wt. _____ 1.0
  Alkalinity, meq./100 g. _____ 0.1
Performance properties of compression moldings:
  Heat distortion, temp., °C. _____ 87
  Vicat softening point, °C. _____ 100
  Impact strength, Izod (⅛ in. bar)
    Notched, ft.-lb./in. _____ 0.8
    Unnotched, ft.-lb./in. with _____ 43
  Tensile data
    Yield strength, p.s.i. _____ 9800
    Ultimate yield, p.s.i. _____ 6300
    Elongation, percent _____ 4–17
  Flexural strength, p.s.i. _____ 15400
  Rockwell hardness (M) _____ 66

In general the above mechanical and performance properties are not significantly different from the properties of a resin prepared with the use of a commercial concentrate of the diglycidyl ether of bisphenol A such as was employed in Example 24, except that the notched impact strength is lower. Accordingly, the resin prepared according to this method is particularly desirable for use in the preparation of surface coatings or adhesives. The analytical properties of the resin prepared in this manner differ from those of the resin prepared with the said diglycidyl ether concentrate in that the number average molecular weight is somewhat lower, the content of cyclic 2:2 component is substantially lower (1.0 vs. 2.4) and the α-glycol content is somewhat higher (0.018 vs. 0.005). The increased α-glycol content is attributed to the α-glycol groups present in the epoxide used as a starting material. No glycols appear to be formed during the condensation reaction with bisphenol A. No significant difference in performance has been found attributable to this very small increase in α-glycol content nor to the somewhat reduced molecular weight.

A significant improvement in resins produced according to Examples 36 et seq. as compared to those produced with the diglycidyl ether concentrate is the reduction in content of low molecular weight, cyclic, high melting, poorly soluble component. This component, in the concentrations in which it is present in resins produced according to the earlier examples, does not affect the performances of molding or other shaped products. However, in the case of resins which are maintained in solution, it has the undesirable property of crystallizing at the storage conditions and causing solutions to become cloudy. It can be re-dissolved by heat but it reprecipitates on cooling. It does not undesirably affect the performance of coatings when it is dissolved, but solutions containing it in excess of its solubility become cloudy and are not suitable for the preparation of smooth, continuous coatings. Solutions of the resins of Examples 36 et seq. and according to Example 15 do not experience such crystallization. These products are, therefore, particularly suitable for use in solution applications, i.e., in the formation of surface coatings and the like.

Example 39

In the preparation of a resin solution from the neutralized reaction mixture of Example 36 the total reaction product is "polish filtered" by filtering the solution at 70° C. through a diatomaceous earth such as Celite 545. Primarily this serves to remove undissolved neutralized catalyst; in addition other insoluble matter such as inorganic salts, dust particles, trash, etc. are removed. The resulting product is a solution of sparkling clarity. The neutralized catalyst which is removed in this fashion is present in the reactor product at a concentration of about 3.0 meq./100 g. resin. The filtration reduces this concentration to 0.5 meq./100 g. resin, a level which does not appear to be detrimental to product performance of a coatings solution.

Example 40

In the recovery of a washed solution of resin in solvent from a process such as that of Example 36, the neutralized reactor product is first diluted with MEK containing 2–7% water to give a 20% weight resin solution. The diluted resin solution is washed twice with MEK saturated water, one volume of water to two volumes of resin solution, at 38–40° C. This reduces the neutralized catalyst level to about 0.1 meq./100 g. resin. After each water wash the solution is settled, the phases are separated and the water layer is withdrawn. MEK present in the water layer is suitably recovered by distillation. Following catalyst removal, the dilute resin solution (now containing approximately 17% wt. resin, 9% wt. $H_2O$ and 74% wt. MEK) is dehydrated and concentrated to a 40% wt. resin in MEK solution. Dehydration is performed by utilizing the favorable vapor liquid equilibrium relationship which exists between MEK and water. The water:MEK weight ratio in the washed resin solution must be equal to or less than 0.11; the ratio is therefore adjusted by adding anhydrous MEK to fall in the desired range. At a higher ratio than 0.11, MEK would be removed instead of water. The dehydration and concentration is accomplished as follows: The washed resin solution is placed in a heated jacketed kettle maintained at a jacket temperature of 230° F. Additional solution is fed into the kettle at the same rate at which vapor is removed. After the desired amount of solution has been added to the kettle, anhydrous MEK is added to complete the dehydration. The resulting product is filtered and is then ready for use or storage.

*Example 41*

Particularly useful in some applications are solutions of the resins of this invention in high boiling solvents, e.g. cresylic acid, 2-methoxy-4-methylpentanone-2, 2-methoxyethane, and the like. Such solutions can be prepared from the washed but not dehydrated solutions of resin in methyl ethyl ketone, as produced according to Example 40, by omitting the final dehydration and concentration. Typically, a washed solution, containing 17% wt. resin, 9% wt. water and 74% wt. methyl ethyl ketone, is placed in an agitated reactor; a high boiling solvent, e.g. cresylic acid is added, while water and methyl ethyl ketone are distilled overhead, first at atmospheric pressure and finally under vacuum, the maximum kettle temperature remaining below 230° F. The final solution contains about 19% wt. resin in high boiling solvent.

In many of the above examples, one of the starting materials has been the diglycidyl ether of p,p'-bisphenol A or a technical concentrate containing the diglycidyl ether in substantial concentration. Such concentrate is suitably prepared as follows:

About one mol of the technical grade of bisphenol containing about 90–93% p,p'-bisphenol A is dissolved in 10 mols of epichlorohydrin. The mixture is brought to 80° C. and 2 mols of 45% aqueous sodium hydroxide added in small proportions over a period of about one hour. During addition, the temperature of the mixture is held at about 90° to 110° C. After the sodium hydroxide has been added, the water formed in the reaction and most of the epichlorohydrin are distilled off. The remaining residue is combined with an approximately equal quantity by weight of benzene and the mixture filtered to remove the salt. The benzene is then removed, leaving a viscous liquid having a viscosity of about 150 poises at about 25° C. and a molecular weight of about 350 (measured ebullioscopically in ethylene dichloride). The product has an epoxy value of 0.5 equivalents per 100 grams. The product prepared in this manner typically contains about 70 to 80% by weight of diglycidyl ether of p,p'-bisphenol A. By suitable modification of the reaction conditions and purity of the starting chemicals relatively higher concentrations up to 95% by weight or more of the diglycidyl ether of p,p'-bisphenol A can be obtained. Undesired components of the mixture can be further reduced by suitable treatment, e.g., vacuum distillation in a film type still.

The following describes a preferred method for carrying out the process of this invention. It will be evident from the numerous examples that various modifications can be made in this method without departing from the invention and losing the advantages thereof. A suitable solvent, e.g., methyl ethyl ketone, is placed in a reaction vessel. Into the vessel are added precisely measured amounts of a dihydric phenol and a diglycidyl ether of a dihydric phenol. The reactants may be pure compounds or may be concentrates of such compounds such as are available in technical grades. In either event, amounts added are such that the ratio of epoxide groups to phenolic hydroxide groups is from 0.980:1.000 to 1.025:1.000. The reactants are preferably added in such an amount that their concentration in methyl ethyl ketone is in the range from 20–60% by weight, although somewhat higher or lower concentrations may be employed. Concentrations between 35% and 45% are preferred. A basic catalyst is added to the mixture. This is preferably a concentrated aqueous solution of sodium hydroxide sufficient to provide 0.025 mol of NaOH per mol of dihydric phenol. When the basic catalyst added is an alkali metal salt of a dihydric phenol, then the amount of dihydric phenol which is present in the catalyst is taken into account in calculating the ratio of epoxide to phenolic hydroxide groups. Similarly, when the diglycidyl ether contains hydrolyzable chlorine groups the amount of catalyst is increased to provide sufficient base to react with the chlorine, and the epoxide groups which are formed in this manner are taken into account in calculating the ratio of epoxide to phenolic hydroxide groups. The amount of water present must not exceed 1 percent by weight of the reaction mixture.

The reaction mixture is brought to a desired reaction temperature, suitably between 75° and 150° C., preferably in a range from 80° to 135° C. or from 80 to 120° C. and is maintained at that temperature with agitation. Preferably the viscosity of samples of the reaction mixture is continuously or periodically measured and the reaction discontinued when the viscosity of the total reaction mixture indicates that condensation product of a desired intrinsic viscosity in the range from 0.3 to about 1 dl./g. measured in dimethoxyethane has been produced. Reaction times of from 1–2 hours, for reaction temperatures near 150° C., to 150–200 hours, for reaction temperatures near 80° C., are normally required. About 6 hours reaction time is typical at 120° C.

When the initial concentration of reactants in the solvent is relatively high, e.g., between 40 and 50% by weight, then it is usually desirable to add additional solvent in the course of the reaction to prevent the solution from becoming excessively viscous.

After the reaction has been discontinued, it is preferred to neutralize the catalyst directly by adding at least sufficient acid, e.g. gaseous carbon dioxide, to react with the basic catalyst present. The reaction mixture is then suitably diluted, e.g., to 20% by weight reactants plus product, by adding solvent such as dioxane or methyl ethyl ketone saturated with water.

The reaction mixture may then be cooled and washed with sufficient water to remove at least most of the salt formed in the catalyst neutralization. The washing step at this stage is not essential if the resin is subsequently recovered by precipitation in a large volume of water. If the precipitating solvent is one which does not dissolve the salt resulting from catalyst neutralization or if a different method of recovery is used, then the resin solution must be washed at this stage to substantially remove the catalyst.

The reaction mixture may be stabilized by removing all solvent by heating under vacuum, if desired, but this step is found to be not essential. If the reaction mixture was stabilized it is redissolved in a suitable solvent, e.g., methyl ethyl ketone or dioxane. In the production of high impact resistant resin of this invention it is preferred to have a solution of the condensation product formed in the reaction step and to recover the resin from solution by rapid and complete removal of solvent from the resin.

This is accomplished, for example, by pouring the solution as a thin stream into a large excess volume of water or other liquid which is a solvent for the solvent associated with the resin, but which does not dissolve the resin itself. The resin solution is poured into the non-solvent under vigorous agitation such as is obtained in a Waring Blendor. This results in a formation of shreds of the desired resin in an aqueous solution of the resin solvent, e.g., methyl ethyl ketone or dioxane. The shreds are recovered by filtration and dried by suitable means, e.g., in an oven under air flow. The resin may be formed into a more suitable form for commercial use such as, e.g., by being extruded or remelted and converted into pellets or nibs.

When it is desired to recover the product in solution form, e.g., for use in surface coatings or adhesives, a suitable method of recovering it is to subject the reaction mixture to a flashing operation in which water is removed and a dry solution of the resin in solvent is recovered as a bottom stream.

Numerous modifications of the above procedure may be made as has been illustrated in part in the examples and will be apparent to the person skilled in the art.

This invention is fully illustrated and described by the foregoing text. However, the following theoretical considerations may assist in a more complete understanding of the invention. For simplicity of description the following symbols are used:

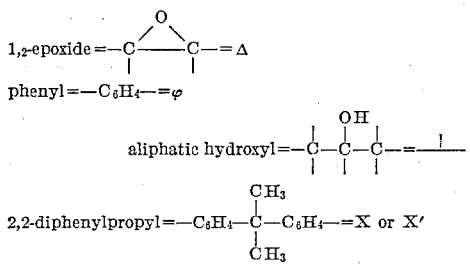

As an illustrative example, consider the reaction of p,p'-bisphenol A with the diglycidyl ether of p,p'-bisphenol A, catalyzed by NaOH.

The reaction chain proceeds as follows:

(1) A hydroxyl ion reacts with a phenolic hydroxyl:

$$\sim\varphi\text{---}OH + OH^- \rightarrow \sim\varphi\text{---}O^- + H_2O$$

(2) The resulting ion reacts with an epoxide

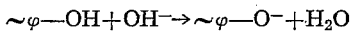

(3) The alkoxide intermediate reacts with another phenolic hydroxyl to yield a neutral resin intermediate and a phenolate ion.

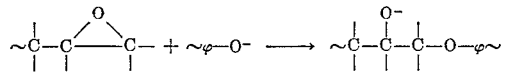

The regenerated $\sim\varphi O^-$ can then continue the chain by reacting with another phenolic hydroxyl.

The overall reaction proceeds to build long linear molecules which can terminate in two epoxy groups, two phenolic hydroxyl groups, or one group of each type. Schematically the possible reactions which result in the formation of each of these types are represented by:

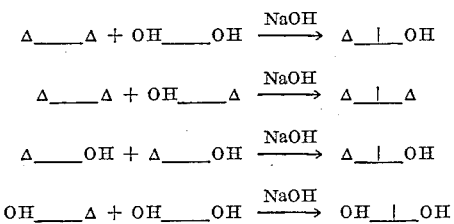

The formation of high molecular weight linear polymers by this type of reaction does not depend on progressive addition of one monomer molecule at a time to a polymer molecule. Instead, polymer molecules are generally built to higher molecular weight mainly by condensation with other molecules.

In the reaction between dihydric phenol and diglycidyl ether, the growth of polymer chains is accompanied by a corresponding increase in the number of aliphatic hydroxyl groups. The linear polymer has the structure:

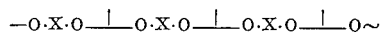

At the same time, the number of phenolic hydroxyl groups decreases as the reaction proceeds. It therefore becomes more likely for an NaOH molecule to react with an aliphatic hydroxyl group. It is then possible for an epoxide-terminated polymer molecule to react with the aliphatic

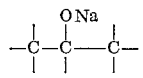

resulting in a polymer molecule having a long branch chain, e.g.

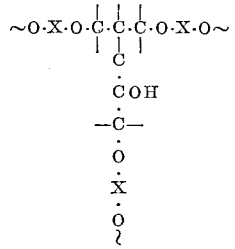

The presence of a significant number of such branched molecules destroys the high impact properties of the resulting product.

Since phenolic OH groups are more acidic than aliphatic ones, NaOH is more likely to react with a phenolic —OH group as long as a substantial number of such groups is present. The probability of NaOH reacting with an aliphatic —OH will be increased by an increase in the concentration of NaOH in the mixture or by an increase of the ratio of aliphatic to phenolic OH groups. It is, therefore, very important that only a very small amount of basic catalyst be present, at least during the later stages of the reaction.

Another seriously objectionable effect is that due to substantial amounts of water. Water can react with a terminal epoxy group to form an alpha glycol. This group has only a minimal reactivity and thus acts both to reduce the reaction rate and to hold down the molecular weight of the polymer by effectively inhibiting further growth of each affected polymer molecule. Water is, thus, a chain stopper. Water concentrations at least up to 0.12 percent do not result in substantial alpha glycol formation. It has been found, however, that any amount of water in excess of about 0.2% by weight is undesirable, and when the amount of water exceeds about one percent of the mixture, the reaction does not proceed to produce high impact linear polymer.

Other compounds whose presence is to be avoided because they act to terminate chains are monohydric phenols and monoepoxides.

It will be understood that it is not practically possible to obtain absolute absence of branching, and it will be evident that the amount of branching present in a given product type will be greater at higher molecular weights or when undesirable impurities were present or adverse conditions used during the reaction. However, by operating at reaction conditions and with feeds described herein, polymers are produced which can properly be designated linear in accordance with scientific and industrial practice. In accordance with such practice, linear polymers are those, such as certain polyolefins, in which the degree of branching present is sufficiently small to produce no substantial adverse effect on properties associated with linearity, e.g., solubility in organic solvents.

Employing the same symbols used above, therefore, where a dihydric phenol OH·X·OH is reacted with a diepoxide

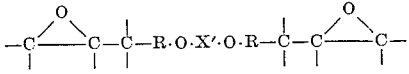

according to the present invention the resulting product consists of essentially linear molecules having the repeating unit

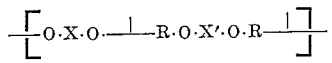

and has the molecular weight and other properties as described hereinbefore. When the dihydric phenol is 2,2-bis(4-hydroxphenyl)propane and the diepoxide is the diglycidyl ether thereof, the repeating unit of the essentially linear molecule will be

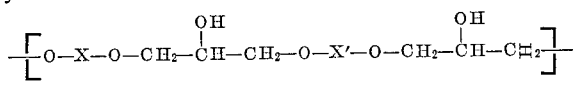

in which X and X' each has the formula

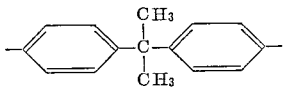

We claim as our invention:

1. A method for producing a polyether resin characterized by high impact resistance when in molded form, which comprises preparing a solution in an inert solvent defined below, of
    (a) a dihydric phenol having its phenolic hydroxyl groups in other than ortho position on a single ring, said phenolic hydroxyl groups being the sole groups thereof reactive with a vic-epoxy group,
    (b) a diepoxide selected from the group consisting of
        (i) terminal-di-vic-epoxyalkanes
        (ii) terminal aliphatic di-vic-epoxy ethers
        (iii) diglycidyl ethers having the general formula

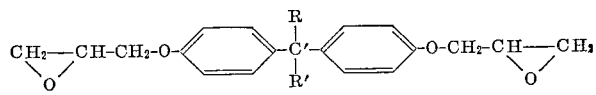

in which R and R' are taken from the group consisting of hydrogen, alkyl and phenyl, the the total number of carbon atoms attached to said atom C' does not exceed eighteen, and the benzene rings are selected from the group consisting of unsubstituted and halogen substituted 4-glycidyl-phenyl groups, and
        (iv) reaction products of 2,2-bis(4-hydroxyphenyl)-propane and epichlorohydrin having a number average molecular weight between 340 and about 2,000, in the ratio of from 1.000:0.98 to 1.000:1.025 phenolic hydroxyl groups to vic-epoxy groups, and
    (c) a catalytic amount, not in excess of 0.1 mole per mole of dihydric phenol, of a basic condensation catalyst selected from the group consisting of hydroxides and phenolates of alkali metals and benzlytrimethyl-ammonium,
        said inert solvent being an organic solvent for both the reactants and the reaction products which is free of groups reactive with said epoxide and phenolic hydroxyl groups, the proportion of reactants being selected to produce a solution of from 20 to 60 percent by weight thereof in said solvent, said solution containing less than one percent by weight of water, maintaining the solution at a temperature in the range from 75° to 150° C. until a linear reaction product having a weight average molecular weight of at least about 40,000 has been formed, and thereafter stopping the reaction.

2. The method of claim 1 wherein said basic condensation catalyst is selected from the group consisting of hydroxides and phenolates of sodium and potassium.

3. The method of claim 1 wherein said catalyst is added as a concentrated aqueous solution containing at least about 45% by weight of alkali metal hydroxide.

4. A method for producing a polyether resin characterized by high impact resistance when in molded form, which comprises:
    (1) preparing a solution in an inert solvent defined below, of
        (a) 2,2-bis(4-hydroxyphenyl)propane and
        (b) a diepoxide condensation product of 2,2-bis(4-hydroxphenyl)-propane and epichlorohydrin having a number average molecular weight in the range from 340 to about 2,000, in the ratio of about 1.000:0.98 to 1.000:1.025 phenolic hydroxyl groups to vic-epoxy groups, together with
        (c) a catalytic amount, not in excess of 0.1 mole per mole of phenol, of a basic condensation catalyst selected from the group consisting of hydroxides and phenolates of sodium, potassium and benzyltrimethyl ammonium, said inert solvent being an organic solvent for both the reactants and the reaction products which is free of groups reactive with said epoxide and phenolic hydroxyl groups, the proportion of reactants being selected to produce a solution of from 20 to 60 percent by weight thereof in said solvent, said solution containing less than one percent by weight of water,
    (2) maintaining the solution at a temperature in the range from 75° to 150° C. until a linear reaction product having a weight average molecular weight of at least about 40,000 has been formed,
    (3) stopping the reaction,
    (4) water-washing the reaction solution, and
    (5) recovering dry, solvent-free resin.

5. A method for producing a polyether resin characterized by high impact resistance which comprises
    (1) preparing a solution in methyl ethyl ketone of
        (a) 2,2-bis(4-hydroxyphenyl)propane and
        (b) a diepoxide condensation product of 2,2-bis(4-hydroxyphenyl)propane and epichlorohydrin having a number average molecular weight between 340 and about 2,000, in the ratio of about 1.000:0.98 to 1.000:1.025 phenolic hydroxyl groups to vic-epoxy groups, together with
        (c) a catalytic amount, not in excess of 0.1 mole per mole of phenol, of a basic condensation catalyst selected from the group consisting of hydroxides and phenolates of sodium, potassium and benzyltrimethyl ammonium, the proportion of reactants being selected to produce a solution of from 20 to 60 percent by weight in methyl ethyl ketone and containing less than one percent water,
    (2) maintaining the solution at a temperature in the range from 75° to 150° C.,
    (3) neutralizing the basic catalyst at a time when the reaction product having a desired weight average molecular weight of at least about 40,000 has been formed,
    (4) diluting the reaction solution with sufficient methyl ethyl ketone containing 1 to 3% by weight of water to reduce the concentration of reactants plus product to about 20% by weight,
    (5) washing the resulting solution with water,
    (6) injecting the washed solution with vigorous agitation into a large excess volume of water, (7) recovering the resulting resin product of high impact resistance and
(8) drying said resin.

6. A method for producing a polyether resin characterized by high impact resistance which comprises
   (1) preparing a solution in methyl ethyl ketone of
       (a) 2,2-bis(4-hydroxyphenyl)propane and
       (b) a diepoxide condensation product of 2,2-bis(4-hydroxyphenyl)propane and epichlorohydrin having a number average molecular weight between 340 and about 2,000, in the ratio of about 1.000:0.98 to 1.000:1.025 phenolic hydroxyl groups to vic-epoxy groups, together with
       (c) a catalytic amount, not in excess of 0.1 mole per mole of phenol, of a basic condensation catalyst selected from the group consisting of hydroxides and phenolates of sodium, potassium and benzyltrimethyl ammonium, the proportion of reactants being selected to produce a solution of from 20 to 60 percent by weight in methyl ethyl ketone and containing less than one percent water,
   (2) maintaining the solution at a temperature in the range from 75° to 150° C.,
   (3) neutralizing the basic catalyst at a time when the reaction product having a desired weight average molecular weight of at least about 40,000 has been formed,
   (4) washing the resulting solution with water,
   (5) adding sufficient methyl ethyl ketone to the washed solution to reduce the ratio of water to methyl ethyl ketone to a value no greater than 0.11,
   (6) distilling an azeotrope of water and methyl ethyl ketone overhead and
   (7) recovering as bottoms a substantially water-free solution of said resin in methyl ethyl ketone.

7. A method for producing a polyether resin characterized by high impact resistance which comprises
   (1) preparing a solution in methyl ethyl ketone of
       (a) 2,2-bis(4-hydroxyphenyl)propane and
       (b) a diepoxide condensation product of 2,2-bis(4-hydroxyphenyl)propane and epichlorohydrin having a number average molecular weight between 340 and about 2,000, in the ratio of about 1.000:0.98 to 1.000:1.025 phenolic hydroxyl groups to vic-epoxy groups, together with
       (c) a catalystic amount, not in excess of 0.1 mole per mole of phenol, of a basic condensation catalyst selected from the group consisting of hydroxides and phenolates of sodium, potassium and benzyltrimethyl ammonium, the proportion of reactants being selected to produce a solution of from 20 to 60 percent by weight in methyl ethyl ketone and containing less than one percent water,
   (2) maintaining the solution at a temperature in the range from 75° to 150° C.,
   (3) neutralizing the basic catalyst at a time when the reaction product having a desired weight average molecular weight of at least about 40,000 has been formed,
   (4) filtering the reaction solution to remove undissolved neutralized catalyst and any other contaminating particles, and
   (5) recovering a clear liquid solution of said resin.

8. The method according to claim 7 wherein said diepoxide condensation product has a Durrans' melting point of about 70° C. and an epoxy equivalency of about 0.20 eq./100 g, the molar ratio of 2,2-bis(4-hydroxyphenyl)propane to diepoxide is in the range from about 1:000:1.01 to 1.000:1.025 phenolic hydroxyl groups to vic-epoxy groups, the reactants are selected to produce a solution of from 35 to 45 percent by weight in methyl ethyl ketone, said solution is maintained at a temperature in the range from 80° to 135° C., and the agent for neutralizing said catalyst is carbon dioxide.

9. The method according to claim 8 wherein said basic catalyst is sodium hydroxide.

10. The method according to claim 8 wherein said basic catalyst is potassium hydroxide.

References Cited by the Examiner

UNITED STATES PATENTS

| 2,602,075 | 7/1952 | Carpenter et al. | 260—47 |
| 2,615,008 | 10/1952 | Greenlee | 260—47 |
| 2,921,049 | 1/1960 | Moroson | 260—47 |
| 2,933,472 | 4/1960 | Bader | 260—47 |
| 2,943,096 | 6/1960 | Reinking | 260—47 |
| 2,945,004 | 7/1960 | Greenlee | 260—47 |

FOREIGN PATENTS 629,111    9/1949    Great Britain

OTHER REFERENCES

Lee et al.: "Epoxy Resins" page 233 relied on McGraw-Hill Book Co. Inc., New York, July 7, 1957.

Turner: "Paint Manufacturer," vol. 26, No. 5, May 1956, pages 157–162.

WILLIAM H. SHORT, *Primary Examiner.*

HAROLD BURSTEIN, *Examiner.*

P. H. HELLER, T. D. KERWIN, *Assistant Examiners.*